United States Patent [19]
Pappas

[11] Patent Number: 5,617,892
[45] Date of Patent: Apr. 8, 1997

[54] IRRIGATION SYSTEM SHUT-OFF VALVE

[76] Inventor: Peter J. Pappas, 2 Hilltop Ter., Woburn, Mass. 01801

[21] Appl. No.: 509,207

[22] Filed: Jul. 31, 1995

[51] Int. Cl.$^6$ ..................................................... F16K 17/00
[52] U.S. Cl. ........................................... 137/360; 137/302
[58] Field of Search ...................... 137/302, 360

[56] References Cited

U.S. PATENT DOCUMENTS

| | | | |
|---|---|---|---|
| 536,801 | 4/1895 | Gaghan | 137/360 |
| 2,808,069 | 10/1957 | McCurdy | 137/302 |
| 2,952,270 | 9/1960 | Fulton et al. | 137/360 |

Primary Examiner—A. Michael Chambers
Attorney, Agent, or Firm—Cesari and McKenna

[57] ABSTRACT

An irrigation system shut-off valve includes first and second hollow housing sections with are threadedly connected by an elongated pipe so that all of the sections lie on a common axis. A valve seat and a valve member concentric to said axis are present in the second housing section, the valve member being movable between a closed position wherein the valve member seals against the valve seat and an open position wherein the valve member is spaced from the valve seat. The valve member is moved between its two positions by a shaft which extends from the valve member along the axis through the first housing section where it is threaded into an end wall of that housing section so that when the shaft is rotated in one direction, the valve member moves to its closed position and when the shaft is rotated in the opposite direction, the valve member moves to its open position so that water can flow from an inlet in the second housing section through the bridging section to an outlet in the first housing section without any appreciable pressure drop.

10 Claims, 2 Drawing Sheets

IRRIGATION SYSTEM SHUT-OFF VALVE

FIELD OF THE INVENTION

This invention relates to a valve. It relates more particularly to a shut-off valve for an irrigation system.

BACKGROUND OF THE INVENTION

An irrigation system is used to dispense water to an area of land containing a lawn or garden. The system usually includes a manifold from which extends a network of pipes terminated by sprinkler heads distributed over the land area being irrigated. The manifold and pipe network are usually located under the ground surface and the sprinkler heads are often of the pop-up type which project above the ground surface when the system is in use.

The manifold is invariably connected to a source of water located inside a building adjacent to the land being irrigated. The connection usually includes a faucet-like valve having an elongated housing which extends through a foundation wall of the building, the head of the faucet and the faucet handle being located at the outside surface of the wall. A faucet stem or shaft extends from the faucet head along the housing to a valve member which is arranged to seal against a valve seat located at the opposite end of the valve housing inside the building. A pipe connects the water supply or mains to the valve inlet located upstream from the valve seat. The valve outlet, located downstream from the valve seat in the valve head is connected by suitable pipes and fittings to the manifold of the irrigation system. Invariably, also, a backflow preventer is included in the line between the valve and the manifold to prevent water in the irrigation system from draining back into the building in the event of a loss of water supply pressure.

The conventional irrigation system is turned on and off, beginning at the start of the growing season, by opening and closing the valve using the valve handle. At the end of the season before the onset of winter, water is usually drained from the irrigation system through a normally closed drain hole located in the valve head. This is done while the valve is closed. To assure that substantially all of the water is purged from the system, air under pressure may be blown into the system through the drain hole causing any water to leave the system through the sprinkler heads. This draining/purging operation also removes all water from the interior of the valve downstream from the valve seat which, as noted above, is located inside the building. In other words, all parts of the valve that are likely to be exposed to cold weather are devoid of water.

Existing shut-off valves of this general type are disadvantaged in many respects. Some such valves provide restrictive flow paths for the water so that there is an appreciable pressure drop across the valve. Whereas water may be delivered to the valve under a typical main pressure of, say, 40 PSI, the water pressure leaving the valve may be only 32 PSI, which pressure may be insufficient to extend the pop-up type sprinkler heads, particularly those at the ends of relatively long pipe runs.

Prior irrigation shut-off valves also tend to be relatively complex and costly structures composed of several different parts which are difficult to make and to assemble. Such complexity also makes it more difficult to inspect and service the prior valves.

SUMMARY OF THE INVENTION

Accordingly the present invention aims to provide a shut-off valve for an irrigation system which does not appreciably restrict the flow of water from the water supply to the system.

Another object of the invention is to provide such a shut-off valve which incorporates several standard fittings and parts.

A further object of the invention is to provide a shut-off valve of this type which is relatively economical to make and is easy to assemble.

Yet another object of the invention is to provide an irrigation shut-off valve which is easy to inspect and to maintain.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

Briefly, my shut-off valve is characterized by a first hollow housing section having a first longitudinal axis, a fluid inlet into the housing which lies on the first axis, a fluid outlet from said first housing section which lies off the first axis and threaded means opposite the inlet defining a threaded passage which extends along the first axis. The valve also includes a second hollow housing section with a second longitudinal axis, a fluid outlet passage lying on the second axis and a fluid inlet passage lying off the second axis. An elongated tubular bridging section connects the first and second housing sections at the fluid inlet and said second outlet passage, respectively, so that the first and second axes are collinear and define a common axis which extends through the bridging section.

Seating means are provided in the second housing section and define a valve seat which is concentric to the common axis. A valve member in said second housing section is movable along the common axis between a closed position wherein the valve member seals against the valve seat and an open position wherein the valve member is positioned in the second housing section so that it does not appreciably obstruct the inlet passage.

A shaft extends along the common axis from the valve member through the threaded passage in the first housing section, the shaft having a threaded segment which is screwed into the threaded passage so that when the shaft is rotated about the common axis in one direction, the valve member is moved to its closed position and when the shaft is rotated about the common axis in the opposite direction, the valve member is moved to its open position so that water can flow from the inlet passage to the outlet without any appreciable pressure drop.

Preferably, the second housing section is a standard T-shaped pipe fitting and the bridging section is a length of standard pipe having one end threaded into an arm of the pipe fitting and its other end threaded into the inlet of the first housing section to help minimize the overall cost of the valve.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
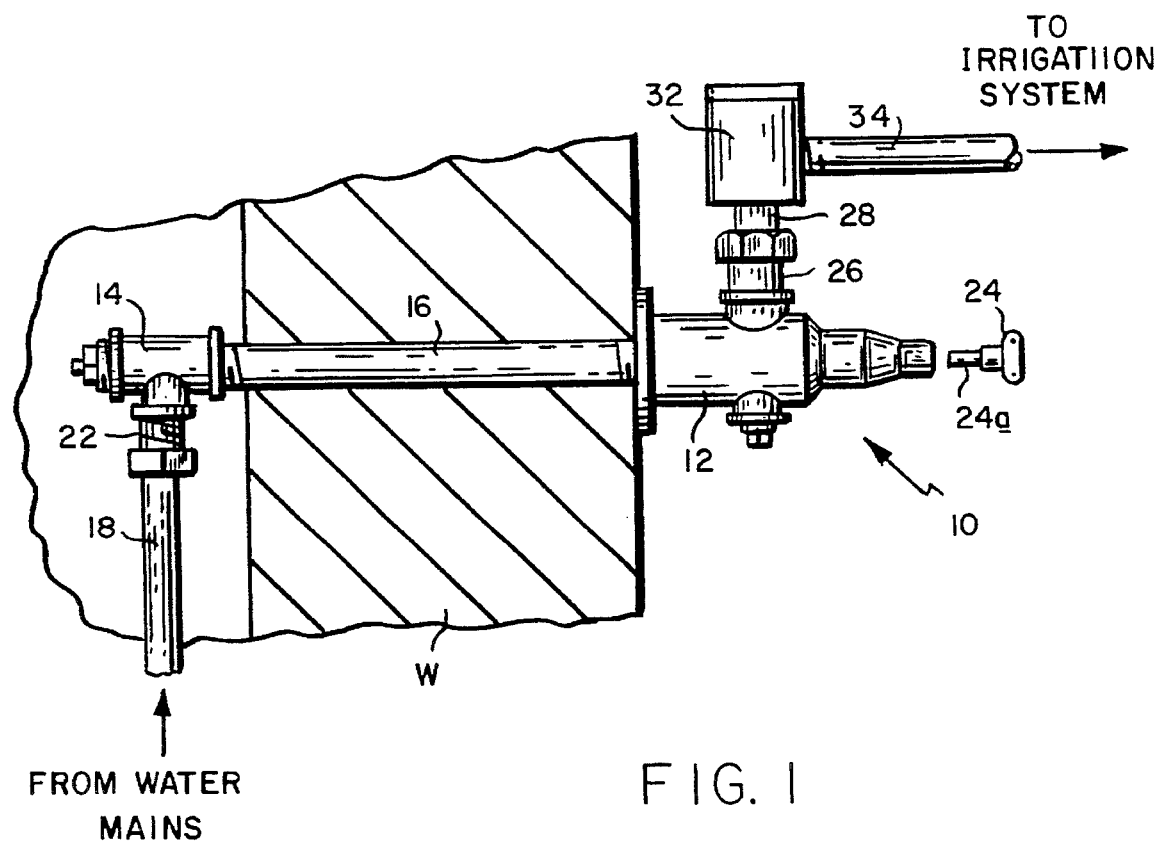
FIG. 1 is a fragmentary elevational view, with parts in section, showing my shut-off valve mounted in a foundation wall.

In FIG. 1 of the drawings, an irrigation shut-off valve incorporating the invention is shown mounted to a building wall W. For example, wall W may be the foundation wall of a house located adjacent to land that is to be irrigated. Valve 10 comprises a hollow head section 12 mounted to the outside surface of wall W, a tail section 14 located adjacent to the inside surface of that wall and a bridging section 16 which extends through a hole in the wall and connects the valve sections 12 and 14.

As will be described in more detail later, the tail section 14 contains a valve seat and a valve member movable toward and away from that seat. Water is delivered to section 14 upstream from the valve seat therein by a pipe 18 connected to section 14 by a standard pipe coupling 22. In the illustrated arrangement, the water may be delivered at a standard household pressure of about 40 PSI.

The movable valve member in section 14 is moved by a key mechanism in head section 12 to be described later which is operated manually by a key 24 which may be inserted into the end of head section 12. When key 24 is inserted and turned in one direction, valve 10 allows the water from pipe 18 to flow through tail section 14 and bridging section 16 to head section 12. From head section 12, the water is conducted via a conventional pipe coupling 26 connected to section 12 to an outlet pipe 28 leading to the inlet of a standard backflow preventer 32. The back flow preventer outlet is connected by a pipe 34 to the manifold of the irrigation system being serviced by valve 10.

When the key 24 is turned in the opposite direction, the valve member in tail section 14 is sealed against its seat so that water no longer flows through valve 10 to the associated irrigation system.

Figure 2:
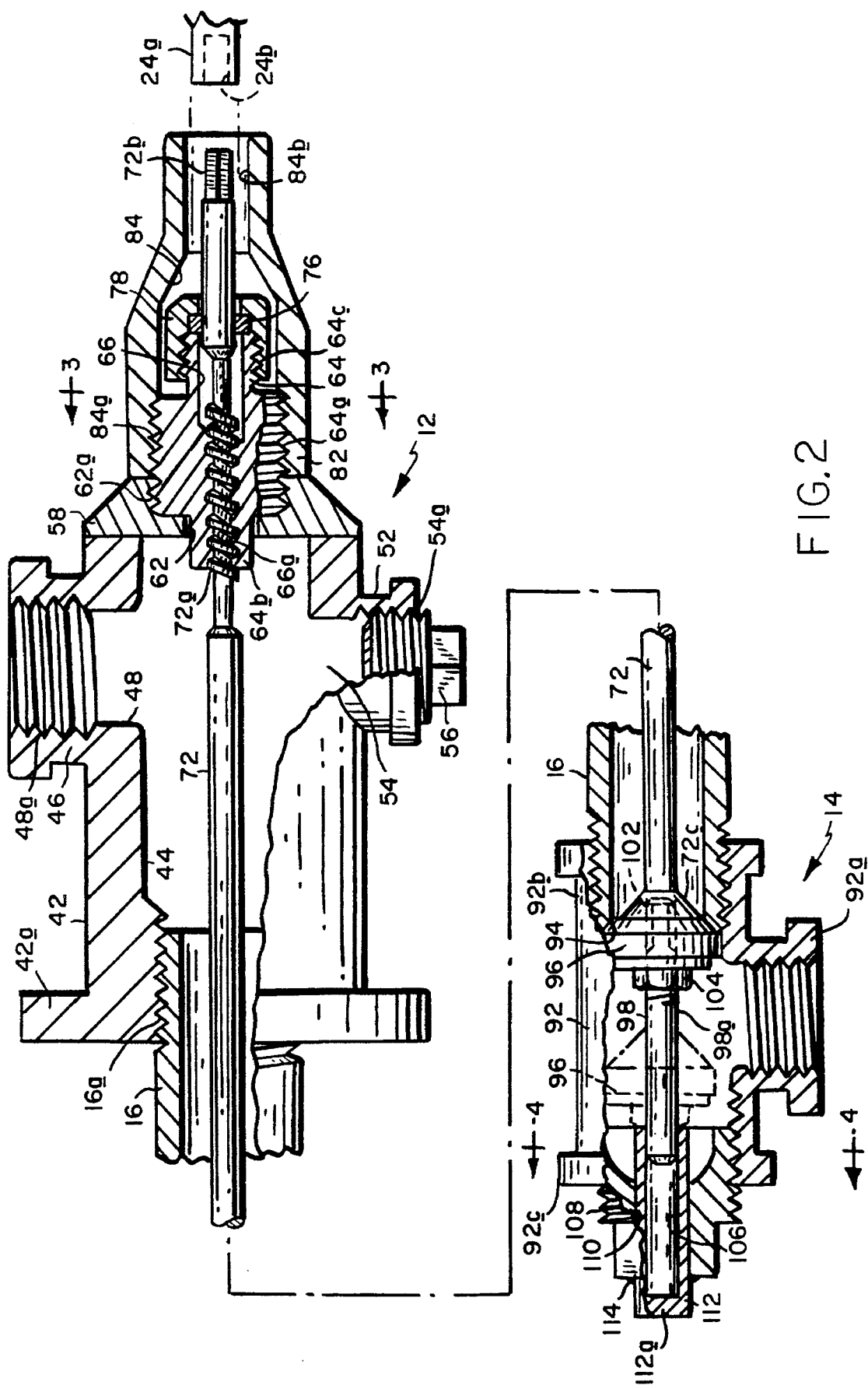
FIG. 2 is a sectional view with parts in elevation, on a much larger scale, showing the internal components of the FIG. 1 valve.

Referring now to FIG. 2, the head section 12 comprises a tubular housing 42, e.g., of brass, having a flange 42a at one end for engaging against wall W (FIG. 1). An axial passage 44 extends the entire length of housing 42. Passage 44 is threaded at the flanged end of the housing to receive a threaded end 16a of the bridging section 16.

Housing 42 also include a side branch 46 defining a passage 48 that intercepts passage 44. The outer end segment 48a of passage 48 is threaded to receive the correspondingly threaded end of the outlet pipe 26 shown in FIG. 1.

A second side branch 52 extending from housing 42 directly opposite side branch 46 defines a drain passage 54, e.g., ¾ inch, that communicates with passage 44. The outer end segment 54a of passage 54 is threaded to receive a conventional threaded brass drain plug 56.

Figure 3:
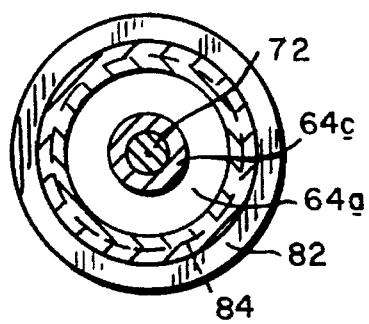
FIG. 3 is a sectional view taken along line 3—3 of FIG. 2.

Turning to FIGS. 2 and 3, brazed or otherwise secured to the opposite end of housing 42 is a circular end plate 58, e.g., of brass, having a central opening 62 that lies on the longitudinal axis of housing 42. A larger diameter threaded counterbore 62a that is collinear with opening 62 extends in from the outer surface of end plate 58 part way through the end plate. Turned down into counterbore 62a is a brass shaft support member 64, Support member 64 includes a relatively large diameter exterially threaded main body 64a which is threaded into counterbore 62a, a relatively small diameter cylindrical extension 64b which projects from main body 64a through opening 62 in end plate 58 and an exterially threaded cylindrical neck 64c which extends from the opposite end of main body 64a.

As shown in FIGS. 2 and 3, an axial passage 66 extends the entire length of shaft support member 64 for rotatably receiving a valve stem or shaft 72 which is preferably of stainless steel. Furthermore, a segment 66a of passage 66 that extends through main body 64a and extension 64b of support member 64 is formed with an helical groove which is shaped and arranged to receive a mating helical thread on a threaded segment 72a of shaft 72. Thus, when shaft 72 is rotated about its axis in one direction, the shaft is moved along the axis of housing 42 in one direction and when the shaft is rotated in the opposite direction, the shaft is moved along the housing axis in the opposite direction. In the illustrated valve 10, the twist of the shaft thread is such that when the shaft 72 is rotated counterclockwise, the shaft translates to the left in FIG. 2 and when the shaft is rotated clockwise, the shaft moves toward the right. However, the thread could just as well have the opposite twist.

As best seen in FIG. 2, shaft 72 projects out an appreciable distance beyond the neck 64c of the shaft support member 64. An O-ring 76 is engaged around shaft 72 adjacent to neck 64c and held in place by an internally threaded annular end cap 78 to provide a rotary seal between shaft 72 and the shaft support member 64. The end segment 72b of shaft 72 beyond end cap 78 is squared off so that it can be received in a similarly shaped receptacle 24b in the shank 24a of key 24, thus enabling the shaft 72 to be turned on its axis by key 24.

Preferably, valve 10 includes a tubular cover member 82 having a variously sized lengthwise passage 84 enabling the cover to engage over, and protectively enclose, shaft support member 64 and end cap 78 and the end 72b of shaft 72. A relatively large diameter inner end segment 84a of passage 84 is threaded to receive the threaded outer end of main body 64a of support member 64. The opposite or outer end segment 84b of passage 84 is sized to receive the shank 24a of key 24 so that the key can engage the shaft end 72b.

Figure 4:
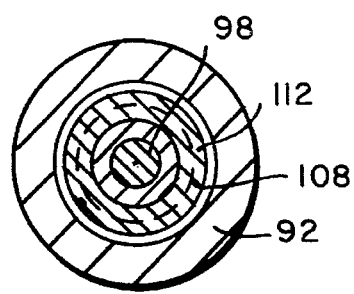
FIG. 4 is a sectional view taken along line 4—4 of FIG. 2.

Referring now to FIGS. 2 and 4, the bridging section 16 of valve 10 preferably consists of a standard 1¼ inch brass or copper pipe whose length may vary depending upon the thickness of the foundation wall W in which the valve 10 is installed. Shaft 72 extends along the entire length of bridging section 16 and into the tail section 14 where it is terminated by a conical flare 72c inside section 14 adjacent to the corresponding end of bridging section 16.

The tail section 14 preferably comprises a standard, internally threaded brass T-shaped pipe fitting 92. The pipe 18 (FIG. 1) from the water supply is screwed into the leg 92a of fitting 92 while the adjacent threaded end 16b of bridging section 16 is screwed into one arm 92b of the fitting. The very end of the section 16 inside arm 92b is beveled to form a valve seat 94 for a correspondingly beveled annular valve member 96. Member 96 is of a rubber or plastic washer material able to form a fluid-tight seal when seated against the valve seat 94.

The valve member 96 is held in place by a stainless steel shaft extension 98 having a threaded end segment 98a which extends through valve member 96 and is screwed into a threaded hole 102 in shaft flare 72c so that shaft 72 and shaft extension 98 are collinear. At least one nut 104 is threaded onto shaft extension 98a beyond valve member 96. The nut may be turned down on the shaft extension to clamp valve member 96 tightly against shaft flare 72c.

The opposite end 98b of shaft extension 98 extends into the arm 92c of T-fitting 92 where it is slidably received in a passage or slide 106 formed in an end plug 108 screwed into the arm 92c of the T-fitting 92. The sliding engagement of the shaft extension 98 in the end plug 108 assures that the movements of the shaft 72 and valve member 96 are confined to movements along the longitudinal axis of valve 10.

The end plug 108 may be a standard 1¼ inch brass end plug which is drilled out to form an axial passage for snugly receiving a brass sleeve 112 that defines the aforementioned passage slide 106. The sleeve 112 may extend beyond the outer end of plug 108 to assure that the passage 106 is sufficiently long to accommodate the full range of movement of the shaft extension 98. Preferably, the outer end 112a of sleeve 112 is closed as shown to exclude dirt, and the sleeve is anchored to end plug 108 by brazing 114 or other suitable means.

As described above, my valve incorporates several standard parts which may be obtained off the shelf. These parts include the bridging section or pipe 16, plug 56, O-ring 76 and end cap 78, tail section 92 and end plug 108 (modified). This enables the cost of the valve to be kept to a minimum. The remaining metal parts may be machined using standard techniques.

After valve 10 is installed as shown in FIG. 1, the valve may be opened to deliver water to the associated irrigation system by turning the valve key 24 in the counterclockwise direction. This rotates the valve shaft 72 so that the valve moves toward the left in FIG. 2 thereby unseating the valve number 96 on the end of shaft 72 from the valve seat 94 and allowing water to flow from the delivery pipe 18 past the valve seat into and along the bridging section 16 and thence into head section 42. From there, the water flows through the outlet 48 and through pipes 28 and 34 to the irrigation system.

It is a feature of the invention that when the valve 10 is fully open, the valve member 96 is located at the position shown in phantom in FIG. 2. Thus, the flow path from the delivery pipe 18 through valve housing 42 to the outer pipe 26 is substantially unrestricted and no water flows through the keying portions of the valve located beyond end plate 58. In other words, water flows freely through valve 10 to the associated irrigation system so that there is substantially no pressure drop; the water pressure in the irrigation system will be substantially the same as the mains pressure so that any pop-up spray heads in the system should operate reliably.

Valve 10 may be closed by rotating the valve key 24 in the opposite or clockwise direction which will cause the valve member 96 to seal tightly against the valve seat 94.

When it is time to drain the irrigation system at the end of the season, the valve 10 may be closed and the drain plug 56 removed. Additionally, a hose connected to a source of compressed air may be attached to the housing 42 at drain passage 54 so that the valve 10 and associated irrigation system can be filled with compressed air which will blow out any residual water in the system through the sprinkler heads. This procedure will also remove any water from valve 10 downstream from the seated valve member 96 located inside the building space. Thus, the portions of the valve exposed to the weather will assuredly be devoid of water so that there is no possibility of freeze-up or structural damage to the valve during the winter season.

If it becomes necessary to clean out service the valve or replace the valve member 94, this is easily done after shutting off the water mains simply by removing end plug 108 and turning shaft 72 counterclockwise until it unscrews from the shaft support member 64. Using shaft extension 98, the entire shaft., including the valve member 96, may then be withdrawn from valve 10 through the arm 92a of tail section 92.

It will thus be seen that the objects set forth above, among those made apparent from the preceding description are efficiently attained. Also, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. A shut-off valve comprising a first hollow housing section including a first longitudinal axis, a fluid inlet into said first housing section and which lies on said first axis, a fluid outlet from said first housing section and which lies off said first axis and threaded means opposite said inlet defining a threaded passage which extends along said first axis;

a second hollow housing section including a second longitudinal axis, a fluid outlet passage from said second housing section and which lies on said second axis and a fluid inlet passage into said second housing section and which lies off said second axis;

an elongated tubular bridging section connecting said first and second housing sections at said fluid inlet and said second outlet passage, respectively, so that said first and second axes are collinear and define a common axis which extends through said bridging section;

seating means in said second housing section defining a valve seat which is concentric to said common axis;

a valve member in said second housing section, said valve member being movable along said common axis between a closed position wherein said valve member seals against said valve seat and an open position wherein said valve member is positioned in said second housing section on the opposite side of said inlet passage from said seating means so that it does not appreciably obstruct fluid flow between said inlet passage and said bridging section, and a shaft extending along said common axis from said valve member through said threaded passage in said first housing section, said shaft having a threaded segment which is screwed into said threaded passage so that when the shaft is rotated about said common axis in one direction, said valve member is moved to its said closed position and when the shaft is rotated about said common axis in the opposite direction, said valve member is moved to its said open position so that water can flow from said inlet passage to said outlet without any appreciable pressure drop.

2. The valve defined in claim 1 wherein said first housing section also has a relatively large drain opening opposite said outlet and further including a removable plug for closing said drain opening.

3. The valve defined in claim 1 wherein said first housing section includes an end wall opposite said inlet and said threaded means is removably mounted to said end wall, and said shaft extends through and beyond said threaded means and includes a projecting end segment which is shaped to facilitate rotating said shaft about said common axis.

4. The shaft of the valve defined in claim 3 and further including a cover removably mounted to said wall for encircling the entire projecting end segment of said shaft.

5. The valve defined in claim 1 wherein said fluid inlet and said outlet passage are threaded and said bridging section is a length of standard pipe whose opposite ends are threaded into said fluid inlet and said outlet passage, respectively.

6. The valve defined in claim 1 wherein said second housing section is a standard T-shaped pipe fitting having a pair of collinear arms and a leg extending perpendicular to said arms and said bridging section has a threaded end which is screwed into one arm of said fitting and said inlet passage is located in the other arm of said fitting.

7. The valve defined in claim 6 and further including an access plug removably threaded into the other arm of said fitting so that removing the access plug, access may be had to said valve member.

8. The valve defined in claim 7 wherein said access plug includes a longitudinal tubular slide which is collinear to said common axis, and further including a shaft extension mounted coaxially to said shaft, said shaft extension being slidably received in said slide to confine the lengthwise motion of said shaft and said valve member to motion along said common axis.

9. The valve defined in claim 6 wherein said valve seat is constituted by the end of said bridging section that is threaded into said fitting.

10. The valve defined in claim 9 wherein said bridging section end is beveled and said valve member is beveled correspondingly.

* * * * *